(No Model.)
R. HAYDEN.
CONDUCTOR SYSTEM FOR ELECTRIC RAILWAYS.
No. 490,597. Patented Jan. 24, 1893.
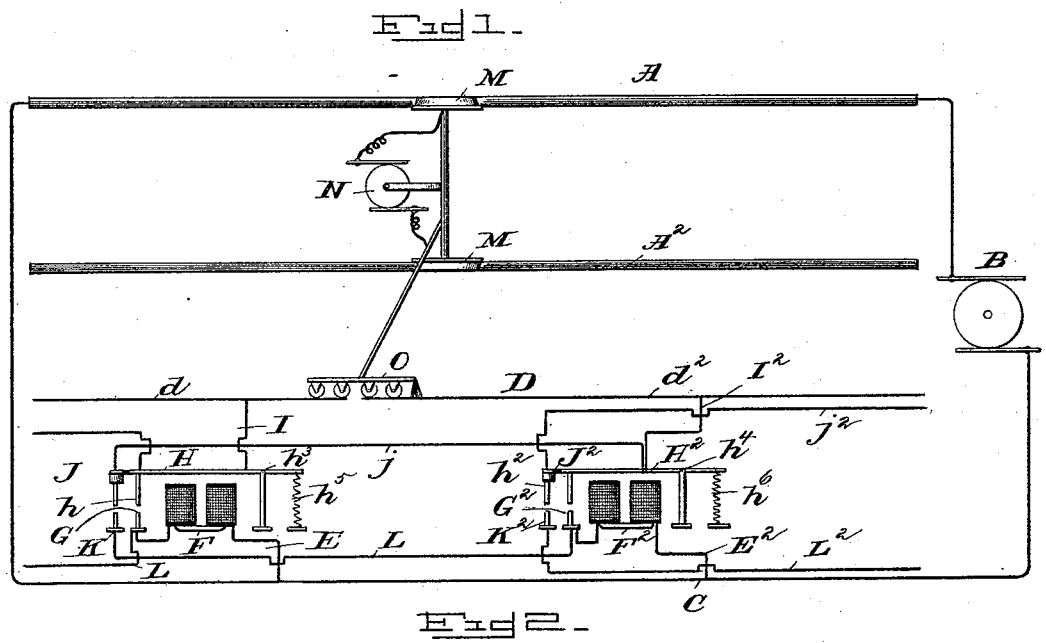
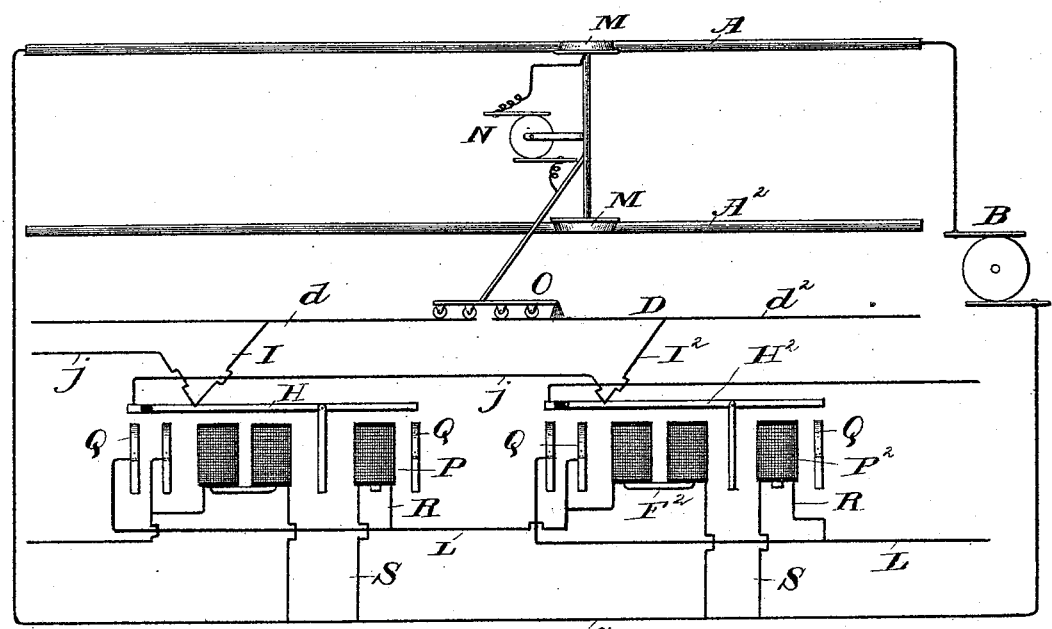
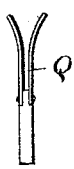
Witnesses
Paul W. Stevens
David H. Mead
Inventor
Raphael Hayden
By R. S. Dyrenforth
Attorney

UNITED STATES PATENT OFFICE.

RAPHAEL HAYDEN, OF FAIRMONT, WEST VIRGINIA.

CONDUCTOR SYSTEM FOR ELECTRIC RAILWAYS.

SPECIFICATION forming part of Letters Patent No. 490,597, dated January 24, 1893.

Application filed April 13, 1892. Serial No. 428,955. (No model.)

*To all whom it may concern:*

Be it known that I, RAPHAEL HAYDEN, a citizen of the United States, residing at Fairmont, in the county of Marion and State of West Virginia, have invented certain new and useful Improvements in Electric-Railway Systems; and I do hereby declare the following to be a full, clear, and exact description of the invention, such as will enable others skilled in the art to which it appertains to make and use the same.

This invention relates to electrical railway systems.

The object of the invention is to produce an electrical railway system of such construction and having its component parts so arranged as to prevent, to the greatest possible degree, loss of electrical energy, by leakage. Furthermore, the object of the invention is to produce an electrical railway system of such construction that there shall be no exposed live portions of one of the conductors, by which electricity is supplied to a motor on a car, except during the time when a car is in a position to receive the current, or when it is just approaching such position; and, furthermore, the object of the invention is to produce an electrical railway system so arranged that the passage of a car along the track will automatically make connection with that part of a conductor immediately adjacent to the car, and will render the section being approached alive, ready to complete a circuit through the motor on the car when the car reaches it, and will automatically cut out a section after the car has passed it.

With these objects in view, the invention consists essentially in an electrical railway system comprising a dynamo or other source of electrical supply, metallic rails, one or both of which are connected with the source of supply, a car running on the rails and carrying a motor electrically connected with the track, a conductor arranged in line with the track and composed of disconnected sections, an insulated conductor connected with the source of electrical supply, and a series of connections between the insulated conductor and the sections, composed wholly or partly of insulated wire wound around one or more soft iron cores, an armature designed to be moved toward the cores, and wires connecting the armatures and the sections, each armature being provided with an insulated contact point electrically connected to the armature of the next succeeding magnet and an electrical connection between a point coming in contact with the insulated point and the next succeeding electro-magnet.

The invention is illustrated in the accompanying drawings in which,

Figure 1— is a view in diagram, illustrating my improved system; Fig. 2— is a similar view, illustrating a modified form of apparatus; and Fig. 3— is a front elevation of one of the V-shaped springs.

In the drawings, A, $A^2$, represent the rails of a railway track, one or both of which are electrically connected to a dynamo B or other source of electrical supply. In the present embodiment of the invention, the rail A, is shown as connected with the dynamo.

C represents an insulated electrical conductor connected at one end to the dynamo or other source of electrical supply B, and which may be, as shown, connected at the other end to the rail A.

D represents a conductor, made up of disconnected sections, which is arranged adjacent to the tracks of a railway.

Electrical connections between the rail A, of the track, and the insulated conductor are made partly by wires E, and $E^2$, connected at one end to the conductor C, and which is for the whole or a portion of its length insulated and wound around one or more soft iron cores, forming one or more electro-magnets F, $F^2$. From the electro-magnets F, $F^2$, the wires E, $E^2$, pass to contact points G, and $G^2$, which are arranged opposite contact points $h$, $h^2$, placed on and electrically connected with pivoted armatures H. The armatures are suitably pivoted at points $h^3$, $h^4$, and are provided with springs $h^5$, and $h^6$, which tend to maintain the armature normally in a position out of contact with the points G, $G^2$. A permanent electrical connection is maintained between the armatures H, $H^2$, and the sections of the conductor D, by metallic connections I, $I^2$. Each armature is provided with a contact-point J, $J^2$, which is electrically insulated from the armature, and to each contact-point J, $J^2$, is attached a metallic connection $j$, $j^2$, extending to and connected with the armature arranged adjacent to the next succeeding section. Arranged adjacent to, and preferably below the contact point J, J², is another contact-point K, K², which is connected, in each instance, by wires L, L², to the contact point G of a succeeding section.

M, M, represent the wheels of a car designed to run upon the track A, A², and N designates a motor placed on the car, and electrically connected with one or both of the rails.

O represents a current-collector extending from the car, electrically connected with the motor, and designed to run along the sectional conductor D.

In the operation of the apparatus, as here described, supposing the current collector O to be on the section $d$ of the conductor, and contact then to be made, by any convenient means, of the point $h$ with the point G, the current will pass from the rail A, through the motor on the car, through the current collector, the section $d$ of the conductor D, the connection I, armature H, contact-points $h$ and G, and the wire E, to the conductor C; the passage of the current through the wire E, a portion of which wire is insulated and wound around the cores, forming electro-magnets F, electrically influences such magnets and retains the armature H, against the point G, thus maintaining a circuit through the motor so long as the collector is upon the section $d$. Simultaneously with the contact of the points $h$ and G, the points J and K, are brought together, thus bringing the section $d^2$ into connection with the insulated conductor L, by way of the wire E², the electro-magnet F², the wire L, the points K and J, the wire $j$, the armature H² shown adjacent to the section $d^2$, and the conductor I². This renders the exposed portion of the conductor D, constituting the section $d^2$, "alive." As the current collector O, which is of sufficient length to more than span the space between the sections of the conductor D, rests in passing partly on each of two adjacent sections, a current will, for a moment, be maintained, as above-described, and also a circuit established, through the section $d^2$, the conductor I², connected therewith, the armature H² arranged adjacent to the section, the wire $j$, the contact-points J and K, the wire L, and the electro-magnet F² arranged adjacent to the section $d^2$, electrically influencing the magnets and moving the armature of section $d^2$ into contact with the contact-point G², thus establishing a circuit as formerly existed through the section $d$ and its appurtenances. As the current collector passes from the section $d$, to the section $d^2$, the current through the electro-magnet F, arranged adjacent to the section $d$, is broken, and the spring $h^5$ exerts itself to remove the armature from the contact-points, thus cutting out the section $d$.

In Fig. 2 of the drawings, I have illustrated a modified form of device, whereby the cutting out of each section after the current collector has passed off of it, is rendered positive and not dependent upon the action of the spring. In this form, an electro-magnet P is arranged adjacent to the armatures H, and suitable means are provided for retaining the armature in the position to which it is moved. For instance, the contact-points may be formed by V-shaped springs Q, between the parts of which the armatures are retained by frictional contact. A connection between each electro-magnet P, P², is established through a conductor R, branching from the wire L, and a wire S connects the electro-magnet P and the conductor C, so that when a current is established between any given armature, as H², and its electro-magnets, as F², a current is simultaneously established through the electro-magnet, as P, of the next preceding section, thus electrically influencing the magnet, as P. Thus, when the current collector passes from a section, the armature of that section will be moved out of contact with the magnets F, cutting out the section. From this it will be seen that a positive movement of the armatures to break the circuit of each section is produced. When these means are employed, there will be sufficient frictional contact between the armatures and the V-shaped spring contact-points Q to retain the armature until the electro-magnets F are energized by the approach of a car. Obviously, other means than those described may be used for retaining the armature in the desired positions.

Having thus fully described my invention, what I claim as new and desire to secure by Letters-Patent is:

1. In an electric railway system, an insulated conductor connected with a dynamo, a contact conductor which is divided at intervals into sections normally disconnected from the insulated conductor and from each other, and means, including one or more electro-magnets, by which, at the time when a current collector passes off of a section preceding a given section, and onto the given section, the preceding section is disconnected from the insulated conductor, and a section succeeding the given section is connected with the insulated conductor, substantially as described.

2. An electrical railway system, comprising a dynamo or other source of electrical supply, metallic rails, one or both of which are connected with the source of supply, a car running on the rails, and carrying a motor electrically connected with the track, a conductor arranged in line with the track and composed of disconnected sections, a connection between the motor on the car and the sectional conductor, an insulated conductor connected with the source of electrical supply, and a series of connections between the insulated conductor and the sections, the connection being composed wholly or partly of insulated wire wound round one or more soft iron cores, an armature designed to be moved toward the cores, and wires connecting the armatures and the sections, each armature being provided with an insulated contact-point electrically connected to the armature of the next succeeding magnet, and an electrical connection between a point coming in contact with the insulated point and the next succeeding electro-magnet, substantially as described.

In testimony whereof I affix my signature in presence of two witnesses.

RAPHAEL HAYDEN.

Witnesses:
　DAVID H. MEAD,
　GLENN B. HARRIS.